United States Patent
Milman et al.

(10) Patent No.: US 9,492,793 B2
(45) Date of Patent: Nov. 15, 2016

(54) METHOD AND APPARATUS OF FLUSH PUMP FEATURE FOR PORTABLE LIQUID PURIFYING FILTER

(71) Applicant: Nephros, Inc., River Edge, NJ (US)

(72) Inventors: Michael Milman, Brooklyn, NY (US); Gregory Collins, Monroe, NY (US); James Summerton, Park Ridge, NJ (US)

(73) Assignee: NEPHROS, INC., River Edge, NJ (US)

( * ) Notice: Subject to any disclaimer, the term of this patent is extended or adjusted under 35 U.S.C. 154(b) by 0 days.

(21) Appl. No.: 14/812,614

(22) Filed: Jul. 29, 2015

(65) Prior Publication Data

US 2015/0329376 A1    Nov. 19, 2015

Related U.S. Application Data

(63) Continuation of application No. 13/888,645, filed on May 7, 2013, now Pat. No. 9,120,058.

(60) Provisional application No. 61/644,239, filed on May 8, 2012.

(51) Int. Cl.
*C02F 1/00* (2006.01)
*B01D 63/02* (2006.01)
(Continued)

(52) U.S. Cl.
CPC .............. *B01D 63/02* (2013.01); *B01D 29/68* (2013.01); *B01D 61/18* (2013.01); *B01D 61/20* (2013.01); *B01D 65/02* (2013.01); *B01D 65/102* (2013.01); *C02F 1/002* (2013.01); *B01D 2313/243* (2013.01); *B01D 2321/04* (2013.01); *C02F 1/444* (2013.01); *C02F 2103/007* (2013.01)

(58) Field of Classification Search
CPC ................... B01D 2313/243; B01D 2321/04; B01D 61/18; B01D 61/20; B01D 63/02; B01D 65/02; B01D 65/102; B01D 65/104; B01D 35/143; B01D 2273/18; C02F 1/002; C02F 1/444
USPC ............................................................ 73/38
See application file for complete search history.

(56) References Cited

U.S. PATENT DOCUMENTS

| 3,445,000 A | 5/1969 | Litt |
| 5,362,385 A | 11/1994 | Klegerman et al. |

(Continued)

FOREIGN PATENT DOCUMENTS

| EA | 002799 | 10/2002 |
| JP | H01 143686 | 6/1989 |

(Continued)

*Primary Examiner* — Freddie Kirkland, III
(74) *Attorney, Agent, or Firm* — Leason Ellis LLP

(57) ABSTRACT

A flush pump feature on a liquid purifying filter includes a segment of flexible tubing containing a small bulb pump is described. Two check valves are positioned upstream and downstream of the bulb pump which then terminates with a simple manually operated open/closed valve. The addition of this flush pump feature enables the filter unit to be easily purged of air at first use and also will make the filter easier to clean and maintain without the need to remove it from a hydration carrier. In addition, the flush bulb feature can also be used to perform a simple visual integrity test of filter while out in a remote location and also can be used to effectively remove bulk water from the filter for lighter storage when not in use which also minimizes freeze related damage when used in a cold environment.

18 Claims, 5 Drawing Sheets

(51) Int. Cl.
  *B01D 29/68* (2006.01)
  *B01D 61/18* (2006.01)
  *B01D 61/20* (2006.01)
  *B01D 65/02* (2006.01)
  *B01D 65/10* (2006.01)
  *C02F 103/00* (2006.01)
  *C02F 1/44* (2006.01)

(56) References Cited

U.S. PATENT DOCUMENTS

| | | | |
|---|---|---|---|
| 5,507,959 A | 4/1996 | Glick | |
| 5,594,161 A | 1/1997 | Randhahn et al. | |
| 6,527,146 B1 | 3/2003 | Tanny et al. | |
| 7,534,349 B2 | 5/2009 | Collins et al. | |
| 8,303,806 B2 | 11/2012 | Mohseni et al. | |
| 8,354,029 B2 | 1/2013 | Hank | |
| 2003/0164333 A1 | 9/2003 | Nohren, Jr. et al. | |
| 2007/0163943 A1 | 7/2007 | Collins et al. | |
| 2013/0319084 A1* | 12/2013 | Milman | B01D 63/02 73/37 |

FOREIGN PATENT DOCUMENTS

| | | |
|---|---|---|
| RU | 2113706 | 6/1998 |
| SU | 1318250 | 6/1987 |
| WO | WO 2008/037969 | 4/2008 |
| WO | WO 2009/019592 | 2/2009 |
| WO | WO 2010/038015 | 4/2010 |

* cited by examiner

METHOD AND APPARATUS OF FLUSH PUMP FEATURE FOR PORTABLE LIQUID PURIFYING FILTER

CROSS REFERENCE TO RELATED APPLICATION

The present application is a continuation of U.S. patent application Ser. No. 13/888,645, filed May 7, 2013, which claims priority to U.S. patent application Ser. No. 61/644, 239, filed May 8, 2012, each of which is hereby incorporated by reference in their entireties.

TECHNICAL FIELD

The present application is directed to portable filtration systems and more particularly, to a flush pump feature that allows a number of different operating modes to be performed to ensure proper operation of the filtration system.

BACKGROUND

Liquid purifying filters, or in particular portable water filters used to purify water for drinking purposes in a remote location, have been in use for many years. In some cases, water purifying filters, such as an ultrafilter or a microfilter, have been incorporated as an inline filter with hydration packs containing a water bladder reservoir that is carried on one's back. In other cases, water filters might be a separately carried item whereby one dips or attaches the inlet of the water filter directly to a source of water to be purified.

In the situations described above, the filter must typically be primed to purge out air of a new filter before it can be effectively used. In some cases, a special air permeable membrane might be used as an aid to help air removal at first use, however these membranes can be costly and add complexity to the finished device. Also, use of an air permeable membrane to aid air removal during actual use makes it difficult to test filter integrity during manufacturing and when in use as many of these methods involve pressurized air to detect filter leaks. In other cases a vent port is included on the water filter such that it can be opened to purge air out of the upstream compartment then closed in order to operate the filter unit. This however, requires the inlet water feeding the filter to be under a positive pressure in order to push air out of the vent port of the filter. For inline filter configurations, one might need to somehow squeeze the water bladder or hydration pack to accomplish this task. This, however, generally requires the hydration pack to be removed from the person's back such that they can apply pressure to the pack, such as by sitting on the pack after opening the vent port. This can be cumbersome to the operator to perform. For stand-alone filters whereby the inlet port of the filter may be placed directly into a stream or lake source, one cannot simply increase the hydrostatic pressure of the inlet water and thus making it very difficult to prime and/or purge air out of the filter which can significantly reduce the flow rate through the filter. In these filter systems, it is common to use suction pressure created by the operator who attempts to suck water from the purified outlet side of the filter.

Also, once a portable filter is in use in the field, sediment and/or other particulate can accumulate on the upstream compartment of the filter which can lead to a plugging of the filter membrane and an a loss of filter flow performance. In these instances, current portable water purifier systems need to be cleaned repeatedly as part of routine maintenance procedures to keep it functioning as intended. In order to carry out these cleaning procedure, typically one must remove or disconnect the filter from the hydration pack or inlet source and then blow air into the purified outlet port of the filter which pushes the resident purified water backwards across the filter membrane as a means to purge out the accumulated particulate in the upstream compartment of the filter. For these cases, the purged fluid would need to exit out of the filter inlet ports. If, however, the filter is designed with a vent port on the filter housing as a means to provide a second port to purge out the accumulated particulate, one would need to open up the hydration pack to access this vent port and then orientate the pack in a suitable way during the blow back operation such that the purged fluid can exit to the external environment instead of flowing into the internal space between the bladder reservoir and the outer hydration carrier pack. It can be seen that these are highly manipulative operations to perform.

There is therefore a need to provide a system that overcomes the above deficiencies.

SUMMARY

To overcome the above difficulties associated with conventional systems, a flush pump feature on a liquid purifying filter is disclosed. In one embodiment, a flush pump feature including a segment of flexible tubing containing a small bulb pump is described. In this embodiment, two check valves are positioned upstream and downstream of the bulb pump which then terminates with a simple manually operated open/closed valve. It will become apparent that the addition of this flush pump feature will enable the filter unit to be easily purged of air at first use and also will make the filter easier to clean and maintain without the need to remove it from the hydration carrier. In addition, the flush bulb feature can also be used to perform a simple visual integrity test of filter while out in a remote location and also can be used to effectively remove bulk water from the filter for lighter storage when not in use which also minimizes freeze related damage when used in a cold environment.

In a second embodiment of the invention is shown whereby the upstream check valve is positioned at or near the inlet port of the purifying filter. In this configuration, the bulb pump unit feature can be used as pump feature to drive water through the filter without suction. Also, it can be used in a pump assist mode whereby one simultaneously pumps the bulb unit and sucks water through the filter as a means to maximize the rate of purified water being produced by the system.

In a third embodiment, the header caps of the filter are made of a flexible material such that the domed section of the cap can function the same as the bulb pump unit described in the second embodiment.

BRIEF DESCRIPTION OF DRAWING FIGURES

DETAILED DESCRIPTION OF PREFERRED EMBODIMENTS

In accordance with one embodiment of the present invention, a filtration system is provided and includes a filter unit 100. The filter unit (device) 100 is in the form of a suitable filtration device that provides filtration and achieves the objectives of the present invention. Any number of different filter units 100 can be used in the practice of the present invention.

The illustrated filter unit 100 includes an inlet port 110 for receiving an un-purified liquid, such as water or any other liquid, and an outlet port 120 for delivering the purified liquid after passing through the filter unit 100. The filter unit 100 is an elongated structure and the inlet port 110 and outlet port 120 are at opposite ends of the elongated structure; however, the ports can be located at different locations of the cartridge in a different embodiment. The filter unit 100 is thus defined by a housing and it can take any number of different shapes including a cylinder as shown in the figures.

The filter unit 100 contains a filter element (filter means) (not shown) which can include a set or bundle of semi-permeable hollow fiber membranes that are potted at each end of the hollow fibers such as described in the present applicant's previous patents including but not limited to U.S. Pat. No. 6,719,907, issued Apr. 13, 2004 and U.S. Pat. No. 7,534,349, issued May 19, 2009, each of which is hereby incorporated by reference in its entirety. The hollow fibers are elongated fibers that have inner lumens through which liquid can pass and the fibers can be bundled together within the cartridge.

Figure 6:
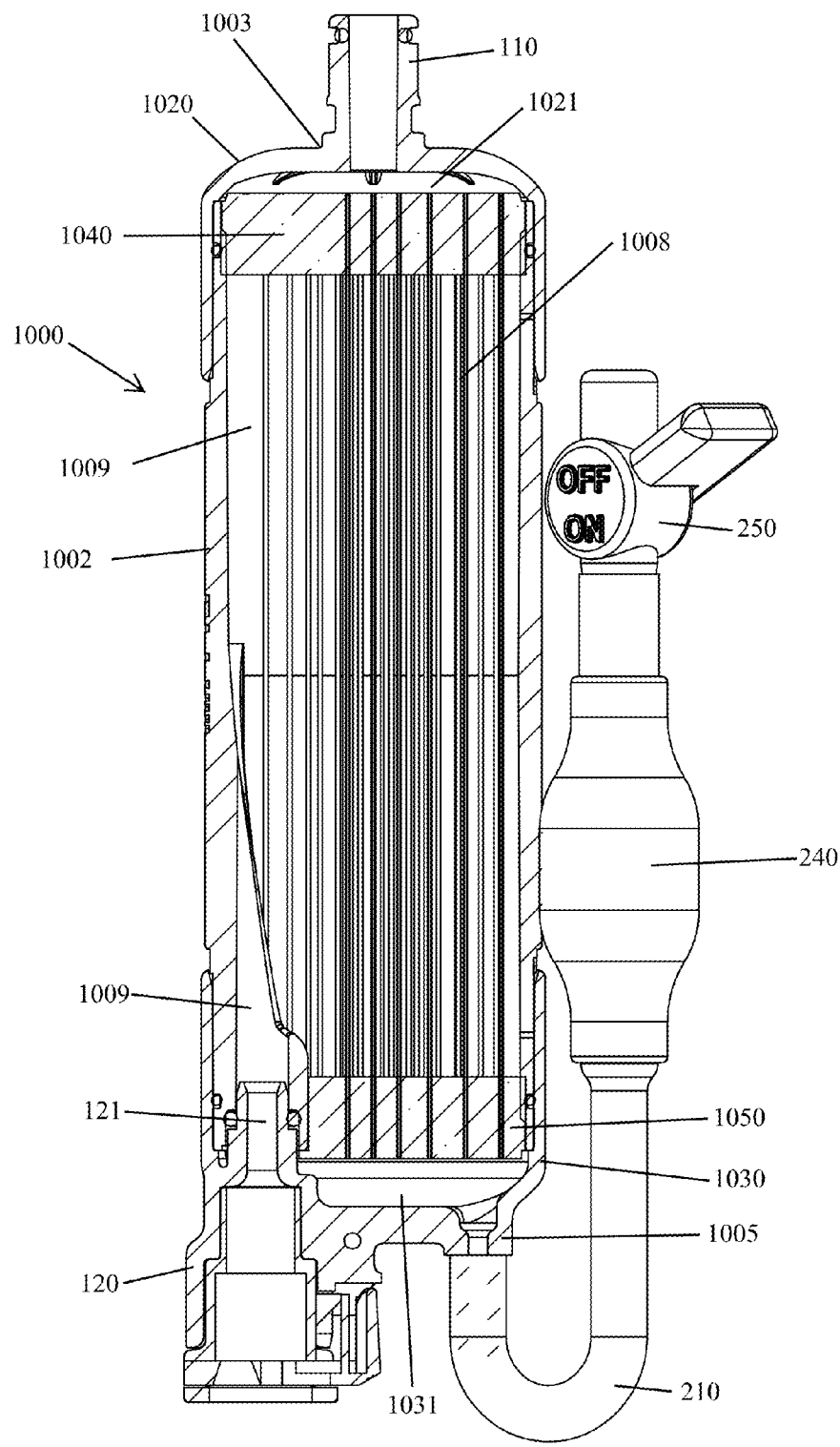
FIG. 6 is a cross-sectional view of one exemplary filtration device that is part of the filtration system.

Reference is made to FIG. 6, which schematically illustrates a cross-sectional view of one exemplary filtration cartridge 1000 in accordance with one embodiment. Cartridge 1000 includes a housing 1002 having a first end 1003 and an opposite second end 1005. Housing 1002 is preferably cylindrical in shape and is formed of a rigid plastic material. Housing 1002 contains a longitudinal bundle of semi-permeable hollow fibers 1008 that are arranged along the length of the housing 1002. The semi-permeable hollow fibers 1008 serve as a means for transferring the toxins or the like (foreign material), which are being removed, from the liquid flowing through the inner lumen portions of the fibers 1008. In particular, filtration occurs when the liquid is filtered across the fiber's wall (e.g., the liquid flows from the inner lumen across the fiber wall to the exterior of the fiber). The filtration thus occurs by conduction of the liquid across the semi-permeable hollow fibers. Any number of semi-permeable hollow fibers 1008 that are commercially available for this intended purpose may be used. For example, semi-permeable hollow fibers 1008 come in variety of dimensions and can be formed of polymers, such as polysulfone, or be cellulose-based. It will be appreciated that there is a space 1009 that is formed within the cartridge and external to the hollow fibers 1008. As described below, it is within this space 1009 that the filtered (purified) liquid is collected after having been filtered by being conducted across the hollow fibers 1008.

The cartridge can include end caps 1020, 1030, at the first and second ends 1003, 1005, respectively. The net 110 can be integral to the cap 1020 and the outlet 120 can be integral to the cap 1030. Between the end cap 1020 and the first ends of the hollow fibers 1008, a first header space 1021 is formed and similarly, between the second ends of the hollow fibers 1008 and the second end cap 1030, a second header space 1031 is formed. As described below, these empty spaces 1021, 1031 allow fluid flow and can receive fluid from either external to the cartridge or from the fibers 1008.

It will be appreciated that potting compounds are used to define the two end header spaces 1021, 1031. In particular, at the first end 1003 of the cartridge a first potting compound 1040 that is used to form a seal around the outside surfaces of the hollow fibers 1008. At the first end 1003, the inner lumens of the fibers 1008 are completely open and therefore, liquid is free to flow directly into the inner lumens of the hollow fibers 1008. Similarly, at the at the second end 1005 of the cartridge a second potting compound 1050 that is used to form a seal around the outside surfaces of the hollow fibers 1008. At the second end 1005, the inner lumens of the fibers 1008 are completely open and therefore, liquid is free to flow out of the hollow fibers 1008 and into the second header space 1031. It will be appreciated and will be more clear from the below discussion that liquid contained within the second header space 1031 is, in a number of operating modes, unpurified (unfiltered) liquid that has flowed longitudinally within the inner lumens of the hollow fibers 1008 from one end to the other end.

The outlet 120 is not in direct fluid communication with the second header space 1031. Instead, the outlet 120 is in direct fluid communication with the external space 1009 that is defined within the cartridge, housing outside of (external to) the hollow fibers 1008. The outlet 120 is constructed such that a conduit (flow path) 121 is defined from the external space 1009 to the outlet nozzle (port) 120 that extends beyond the cartridge housing. The conduit 121 thus fluidly links the external space 1009 to the outlet nozzle; however, the conduit 121 is routed outside of the second potting compound 1050 so as to avoid being in communication with the second header space 1031. Since the space 1009 contains purified liquid, the outlet 120 receives fluid from this location and more specifically, the outlet 120 is illustrated at the second end of the cartridge, as an exemplary location for the outlet 120; however, the outlet 120 can be formed at other locations such as along the side of the cartridge. In such a location, the outlet 120 is in the form of a nozzle (port) that is in direct communication with the space 1009 to allow filtered liquid to flow from the space 1009 out of the cartridge (in purified form) and thus, be available for drinking or use.

It will be appreciated that the present invention is not intended to cover the specifics around the filter element and/or filter unit design (and thus is not limited to the constructions shown in FIG. 6) but rather is directed to an added feature that makes the use of the portable filter unit more easy to use in the field (e.g., outdoor). In order to be used in the filtration scheme disclosed herein, the filter unit 100 is constructed so as to at least contain the inlet port 110 for receiving unpurified liquid, the outlet port 120 for delivery of the purified liquid, and a flush port 130 that is in fluid communication with an upstream compartment of the filter unit 100 whereby air and/or accumulated sediment can be purged out of the upstream compartment, such as during priming and cleaning operations as disclosed herein.

A flush pump feature 200 is composed of a tubing segment 210, two one-way flow check valves 220, 230, a flexible bulb unit 240, and a flush valve 250, whereby the internal fluid path of the flush pump components is in fluid communication both with the upstream compartment of the filter unit 100 and the flush port 130. The flush pump feature is thus in fluid communication with a region (upstream compartment) of the cartridge in which unpurified liquid exists (i.e., a location at which the liquid has not undergone the filtration process by being conducted across the hollow fibers).

The tubing segment 210 can be a flexible tubing segment, such as made from a flexible PVC material while its length can be as short or as long as desired depending upon how the filter system is being used. For example, if the filter unit 100 is contained inside a hydration carrier pack (worn by a user), the length of the tubing segment 210 can be adjusted so as have the bulb unit 240 and the flush valve 250 easily accessible (e.g., by routing them to a position that is accessible on the outside of the hydration pack).

It will be appreciated that the tubing segment 210 is in direct fluid communication with the second header space 1031 and thus, fluid exiting the inner lumens of the hollow fibers 1008 can flow directly into the second header space 1031 and into the tubing segment 210 as described below. As mentioned above, since the outlet 120 is not in communication with the second header space 1031, the tubing segment 210 is not in fluid communication with the outlet 120.

The check valves 220, 230 can be any of those known in the art, which include but are not limited to flap valves, duck-billed type valves, disc valves, or ball and seat valves. The check valves 220, 230 thus allow fluid to flow in one direction, namely in a direction toward the flush port.

The bulb unit 240 can be a simple bulb pump type made from a flexible material as known in the art, or can be made using another volume displacement pump configuration which can be operated manually such as a bellows type pump that can contain an internal spring to keep it an expanded state. The flush valve 250 can be a simple open/close type valve with a lever used to operate the valve, or can simply be a cap that taken on or off to effectively open or close the flush ports. Operation of the filter unit 100 containing the flush pump feature 200 is further described below. More specifically, the flush pump feature 200 has a number of different operating conditions (modes) that are described below.

For example, a first operating mode is a forward-flush/air-purge mode as described below.

Figure 4:
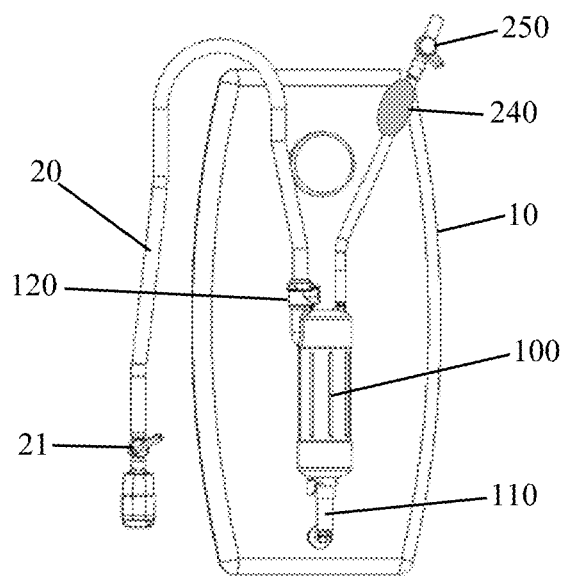
FIG. 4 is side view of a filtration system in accordance with the present invention incorporated into a portable hydration pack that can be worn by a person.

1) Forward-Flush/Air-Purge:

One exemplary operation of this mode is when the filter unit 100 is connected with a hydration pack 10 (FIG. 4) to a reservoir that is filled with a liquid (e.g., water) and a hydration drink tube valve 21 (that is associated with a drink tube 20) is closed. FIG. 4 shows such exemplary construction in which the hydration pack is generally shown at 10 and the drink tube is generally shown at 20. The drink tube 20 is connected at its end to the outlet 120 and thus purified liquid flows through the drink tube 20 to the user for consumption/use. The drink tube valve 21 is located along the length of the drink tube 20 and as mentioned above, this valve is closed in this operating mode. Any number of different controllable valves can be used for valve 21.

To perform a forward-flush and/or air-purge of the filter unit 100, the flush port valve 250 is first opened, thereby providing communication with the second header space 1031 and the inner lumens of the fibers 1008. Next, the bulb pump unit 240 is squeezed until a clear and steady stream of fluid (e.g., water) without any air bubbles is observed exiting the flush valve 250. This results since operation of the bulb pump unit 240 creates negative pressure which causes fluid within the second header space 1031 and within the inner lumens of the hollow fibers 1008 to be drawn into the tubing (conduit) 210 before exiting through open flush valve 250 as described below.

In one embodiment, at least about ½ cup exits the flush valve 250; however, in other embodiments, a different volume can be discharged during performance of this step.

Thus, upon squeezing the bulb pump unit 240, fluid is pushed out of the bulb pump unit 240 through the outlet check valve 230, while the inlet check valve 220 prevents fluid from going back into the filter unit 100. After squeezing the bulb pump unit 240, the bulb pump unit 240 is allowed to relax back to its normal state by removing one's grip of the bulb pump unit 240. This creates a negative pressure inside the bulb pump unit 240 which draws fluid through the inlet check valve 220 and into the bulb pump unit 240. This effectively draws additional unpurified water into the inlet port 110 and the upstream compartment (including first header space 1021) of the filter unit 100. The orientation of the outlet check valve 230 prevents fluid from coming back toward the bulb pump unit 240 from the flush port side. Repeated pumping of the bulb pump unit 240 draws a semi-continuous stream of un-purified fluid through the upstream compartment of the filter unit 100 to forward flush contents out through the flush port 130. At the completion of this step, the flush port valve 250 is closed so as to ready the unit 100 for use. If water is being purified by the filter unit 100, the drink tube valve is opened and a user can drink the purified water through the drink tube 20.

It will be appreciated that when the flush valve 250 is closed, the second header space 1031 is effectively closed off and liquid does not flow through the inner lumens of the hollow fibers to the second header space 1031 (since water already fills this compartment and has nowhere to flow). Instead, water (liquid) is forced across the semi-permeable hollow fibers 1008, thereby filtering the liquid. Thus, operation of the filter unit 100 results in filtering of the liquid.

A second operating mode is one in which the filter unit 100 is cleaned with combination of back-flush and forward-flush.

2) Cleaning the Filter with Combination Back-Flush and Forward-Flush:

In the case of very dirty (turbid) liquid (water), a user can perform a combination back-flush and a forward-flush to more thoroughly clean the filter unit 100 as described below.

First, the user makes sure that the liquid (water) is contained inside the drink tube 20 by sucking on the drink tube 20 until the liquid (water) is coming out (i.e., filtered liquid within space 1009 is drawn through outlet 120 and into the drink tube 20). Next, the user opens the flush valve 250 and manually blows air into drink tube 20 by mouth, while simultaneously squeezing the bulb pump unit 240 until the fluid stream is relatively clear or free of the concentrated sediment. Upon blowing air back into the drink tube 20, the water contained in the drink tube 20 is effectively forced backward across the filter element (hollow fibers 1008) of the filter unit 100 to help dislodge particulate that may be stuck to the dirty side of the filter element. In other words, the liquid flows across the hollow fibers 1008 from the exterior space 1009 to the inner lumens of the hollow fibers 1008.

As indicated in the immediately preceding operating mode, simultaneous pumping of the bulb unit 240 draws a semi-continuous stream of un-purified fluid through the upstream compartment of the filter unit 100 to forward flush contents out through the flush port 130. When completed, the user then closes the flush valve 250 to ready the filter unit 100 for use.

Yet another operating mode is a mode for emptying the filter unit 100 of bulk liquid.

3) To Empty Filter Unit of Bulk Liquid:

In order to fully remove excess liquid from the filter unit 100, a user can perform the following steps.

First, a user opens the flush valve 250 and pumps the bulb pump unit 240 until the exiting stream is relatively clear and without air bubbles. Next, the user disconnects the inlet filter port 110 from the inlet source (in this example the reservoir bladder contained in the hydration pack 10) and immediately caps the inlet filter port 110 to prevent fluid from entering or exiting the inlet filter port 110. Next, the user makes sure that the filter outlet port 120 is open to atmospheric pressure. The user then pumps the bulb pump unit 240 until water flow ceases to come out of the flush port 130. Because the inlet port 110 is capped, fluid is drawn backwards across the filter element (hollow fibers 1008) upon repeated pumping of the bulb pump unit 240. In other words, the liquid flows from exterior space 1009 to the inner lumens of the hollow fibers 1008. When all the fluid is drawn across the filter element (conducted across the hollow fibers 1008), the bulb pump unit 240 will remain in a flat position (i.e., no longer is able to expand back to its normal shape).

At this point, the downstream filter compartment (including second header space 1031) of the filter unit 100 should be filled with air that has entered from the purified exit port 120. Next, while holding the filter unit 100 upside-down, the user then removes the cap that was placed on the inlet port 110 which allows air to enter directly from the inlet port 110. Repeated pumping of the bulb pump unit 240 now draws a semi-continuous stream of air into the upstream compartment (first header space 1021) which further displaces the upstream liquid until no more liquid comes out from the flush port 130. In other words, air drawn into the first header space 1021 displaces fluid within the inner lumens of the hollow fibers 1008.

If desired, the user can then shake the filter unit 100 to remove any excess fluid contained at or near the inlet or outlet ports 110, 120. Upon removal of the bulk liquid, the user can close the flush port valve 250 and cap the inlet/outlet ports 110, 120 for storage of the filter unit 100.

In yet another operating mode, a field integrity test is performed as described below.

4) Field Integrity Test (FIT)

To perform the field integrity test, the following steps are performed to check for damage of the filter unit 100 including the filter element (hollow fibers 1008).

Figures 5A, 5B:
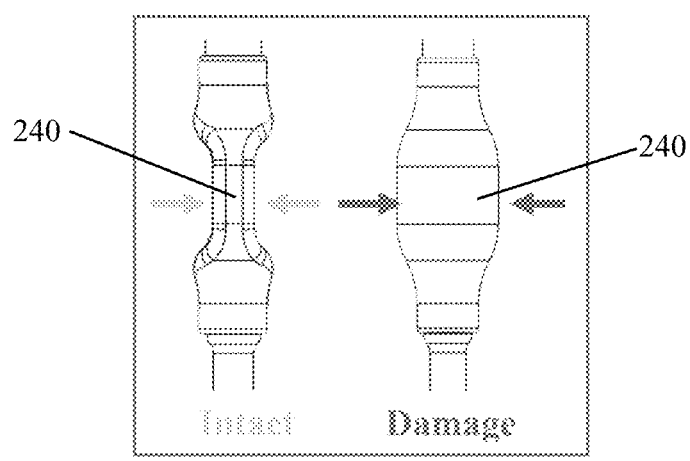
FIG. 5A shows a bulb pump unit of the present invention in a collapsed state indicative of the filter unit passing an integrity test.
FIG. 5B shows the bulb pump unit of the present invention in an inflated state indicative of a damaged condition with respect to the filter unit resulting in failure of the integrity test.

First, the user opens the flush valve 250 and pumps the bulb pump unit 240 (by squeezing the bulb) until the exiting stream is relatively clear and without air bubbles. Next, the user disconnects the inlet filter port 110 from the inlet source (in this example the reservoir bladder contained in the hydration pack) and immediately caps the inlet filter port 110 to prevent fluid from entering or exiting the inlet filter port 110. Next make sure that the filter outlet port 120 is open to atmospheric pressure. The user then pumps (by squeezing) the bulb pump unit 240 until water flow ceases to come out of the flush port 130. Because the inlet filter port 110 is capped, fluid is drawn backwards across the filter element (fluid flows from exterior space 1009 to the inner lumens of the hollow fibers 1008) upon repeated pumping of the bulb pump unit 240. When all the fluid is drawn across the filter element, the bulb unit should remain in a flat position (i.e. no longer is able to expand back to its normal shape) provided the filter unit 100 including its filter element (hollow fibers 1008) is intact and provided that an intact filter element does not normally allow air to pass through. It is understood to those skilled in the art that air pressure tests (e.g., bubble point, air flow, and pressure decay tests) are used to measure filter integrity which includes the filter element inside the filter unit. Upon visual inspection of the flattened bulb pump unit 240 over a set period of time, such as 10 to 40 seconds, one can determine if the filter unit 100, including its filter element, has failed or not. As an example, FIGS. 5A and 5B show the appearance of the bulb pump unit 240 after a set period of time as elapsed once it reached the flattened (or collapsed) state. FIG. 5A shows the bulb pump unit 240 remaining flat (compressed) for at least 40 seconds indicating the filter is good (no significant damage). However, if the bulb pump unit 240 does not stay compressed, such as in FIG. 5B, the filter integrity may have been compromised. In other words, if the filter element is damaged, such as having a hole, air can flow into the fiber(s) and then flows to the bulb pump unit 240 resulting in inflation of the bulb. Depending upon its use, the user can then take proper precautions on whether or not to use the filter after the test has been performed.

Figure 1:
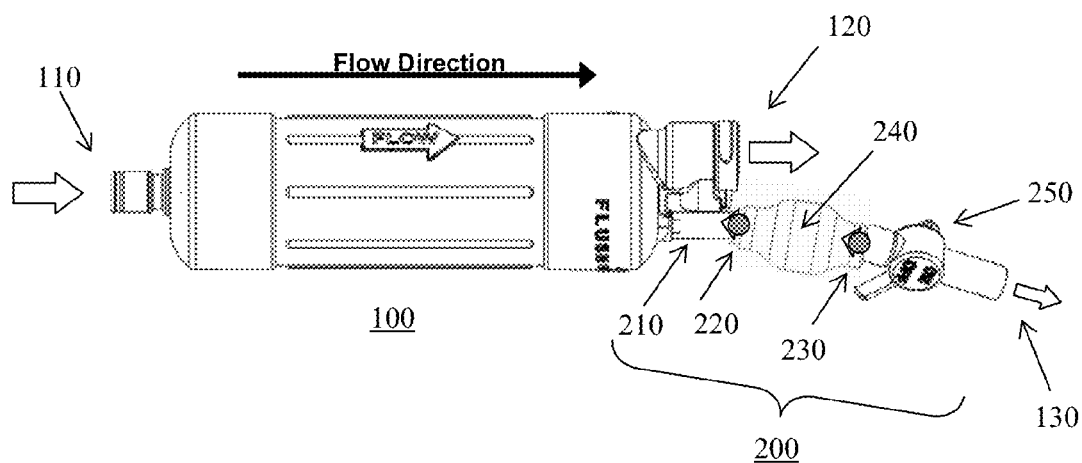
FIG. 1 is a side perspective view of a filtration system in accordance with one embodiment.
Figure 2:
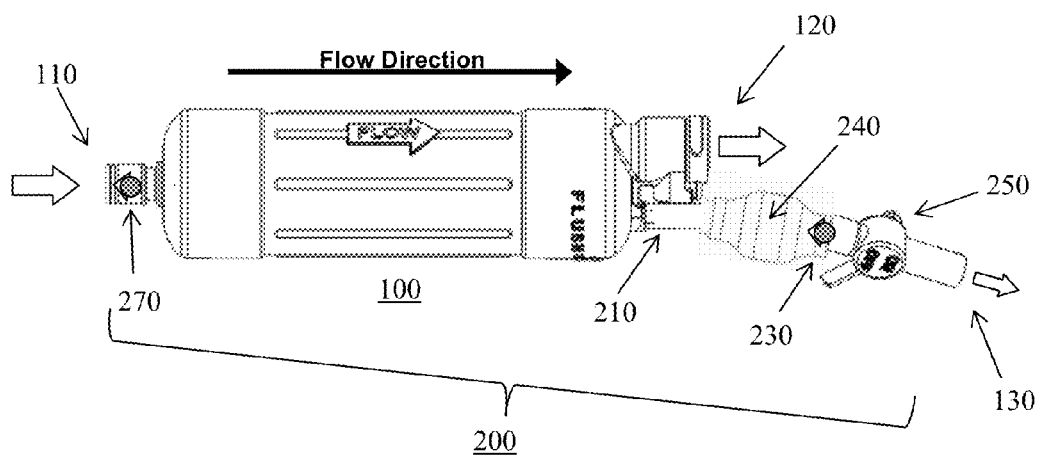
FIG. 2 is a side perspective view of a filtration system in accordance with one embodiment.

In a second embodiment of the invention, the inlet check-valve to the bulb pump unit 240 has been repositioned to add additional functionality of the flush pump feature 200. As shown in FIG. 2, a first check-valve 270 is positioned at or near the inlet port 110 of the filter unit, while the second check-valve 230 remains at the distal end of the bulb pump unit 240. The advantage of this is that it enables a pump and/or pump assist mode of the filter unit which is further described below.

Additional operating modes include pump and pump-assist modes.

5) Pump and Pump-Assist Modes:

This is similar to the operating mode described above in which the filter unit 100 is connected with a hydration pack containing a reservoir filled with liquid (water) and the hydration drink tube valve is closed as shown in the FIG. 4.

After the filter unit 100 has been primed and is ready for use (flush valve 250 closed) in a similar manner as described above, the user opens the drink tube valve such that it is open to atmospheric pressure. Now upon repeated squeezing of the bulb pump unit 240, a positive pressure is created on the fluid residing in the upstream compartment of the filter unit 100. This is apparent since fluid contained in the bulb pump unit 240 cannot exit through the closed flush valve 250 and cannot exit out through the inlet filter port 110 because of the positioned check valve 270 at this location. Since the outlet port 120 is open to atmospheric pressure, the higher pressure caused by squeezing the bulb pump unit 240 is sufficient to force water across the filter element and out through the outlet port 120 thus creating purified fluid. Upon release of the bulb pump unit 240, the bulb returns to its normal (extended) state which creates a negative pressure within the upstream compartment of the filter unit 100. Provided un-purified fluid can more easily enter the inlet port through check-valve 270 than can be reverse filtered from the "just-purified" fluid in the downstream compartment of the filter unit 100, the upstream compartment will fill mostly with un-purified fluid. In this way, there is a net forward movement of un-purified fluid (water) across the filter element 1008 and out the purified exit port 120. In this mode, the bulb pump unit 240 acts as a positive displacement pump which enables purification without the need to manually suck fluid through the filter using the drink tube.

In a pump-assist mode, the same method used above can be used with the addition that the user can also simultaneously drink (suck) water from the drink tube 20. In this mode, pone can drink water at a higher rate than by sucking alone.

Figure 3:
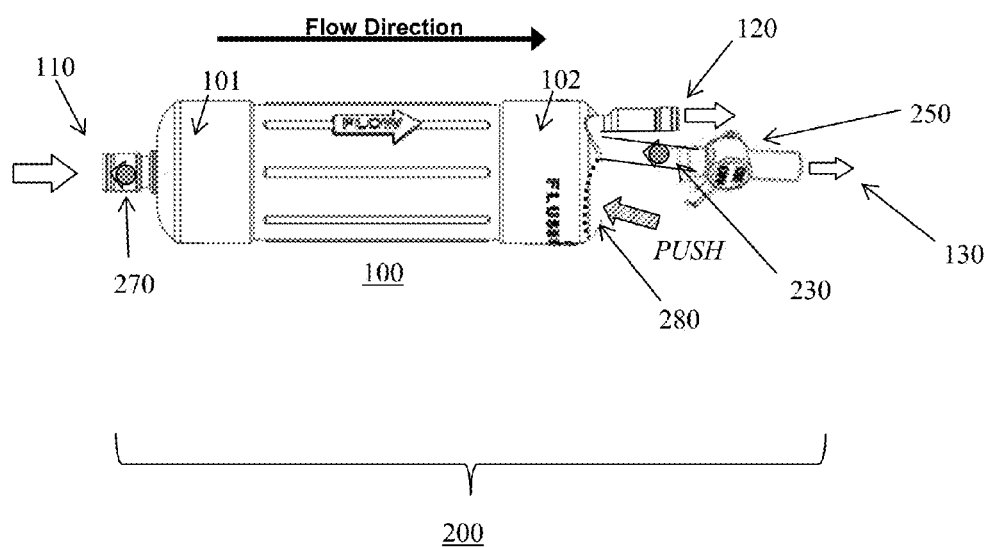
FIG. 3 is a side perspective view of a filtration system in accordance with one embodiment.

In a third embodiment, as illustrated in FIG. 3, the end caps 101, 102 of the filter unit 100 can be constructed with a flexible material such as silicone rubber or flexible PVC or may have a flexible domed insert as part of the end cap. To those skilled in the art, one can see that it would be possible to integrate the function of the bulb pump unit as part of this flexible domed header cap. As shown in FIG. 3, end cap 102 contains a flexible domed feature 280 that can be manually pushed inward to depress the dome and released to allow the dome to return back to its normal shape. This action would have the same result as pumping the bulb pump unit 240 described in the second embodiment which is discussed as follows. Upon repeated pressing of the domed portion 280, a positive pressure is created on the fluid residing in the upstream compartment of the filter unit 100. This is apparent since fluid contained in the domed region of the end cap 102 cannot exit through the closed flush valve 250 and cannot exit out through the inlet filter port 110 because of the positioned check valve 270 at this location. Since the outlet port 120 is open to atmospheric pressure, the higher pressure caused by depressing the domed end cap 102 is sufficient to force water across the filter element and out through the outlet port thus creating purified fluid. Upon release of the domed end cap, the dome feature returns to its normal state which creates a negative pressure within the upstream compartment of the filter unit. Unpurified fluid then enters the inlet port through check-valve 270 to refill the upstream compartment. In a manner similar to the second embodiment described herein, one can operate the system in both a pump mode or in a pump-assist mode.

It will be understood that the above disclosure is merely exemplary and is not limiting of the scope of the present invention which covers variations thereof.

What is claimed is:

1. A portable liquid purifying device configured to purify a source of liquid in a remote location comprising:
   a filtration unit defined by a housing that contains a filter element for filtering a liquid, the filtration unit having an inlet for receiving unpurified liquid and an outlet for discharging purified liquid that has passed through the filter element, wherein a first header space is formed between a first end of housing and a first end of the filter element and a second header space is formed between a second end of the housing and a second end of the filter element, wherein an interior space is defined between the housing and an exterior of the filter element, the interior space being prevented from having fluid communication with an interior of the filter element in which the unpurified liquid flows, wherein the inlet is in fluid communication with the first header space and the outlet is in fluid communication with the interior space and not the second header space;
   a flush pump accessory that is coupled to the filtration unit and configured to operate according to a plurality of different operating modes, the flush pump accessory having a first conduit that is in fluid communication with the second header space; a bulb pump that is fluidly connected at a first end to the first conduit; a flush valve that is disposed along a second conduit that is fluidly connected to a second end of the bulb pump, wherein in a closed position, the flush valve prevents liquid to flow through the second conduit to a flush port; and
   a plurality of valve members including: a first valve that is located between the bulb pump and the inlet so as to be upstream of the bulb pump, the first valve configured to restrict flow of the unpurified liquid into the flush pump accessory when in a closed position; and a second valve disposed between the bulb pump and the flush valve, wherein the first valve, second valve and flush valves are open when at least one of a flush operation and air purge operation is performed and at least the second valve and the flush valve are closed during a filtration operation in which unpurified liquid is filtered across the filtering element to the internal space and then flows through the outlet as purified liquid.

2. A portable liquid purifying device configured to purify a source of liquid in a remote location comprising:
   a filtration unit defined by a housing that contains a filter element for filtering a liquid, the filtration unit having an inlet for receiving unpurified liquid and an outlet for discharging purified liquid that has passed through the filter element and has been purified, the filter element comprising a plurality of semi-permeable hollow fibers; and
   a flush pump accessory that is coupled to the filtration unit, the flush pump accessory being connected to the filtration unit by a flush pump conduit and including a bulb pump that is operable to draw fluid from the filtration unit through the flush pump conduit to an open end thereof, the flush pump accessory being in fluid communication with lumens of the semi-permeable hollow fibers such that only fluid flowing within the lumens of the semi-permeable hollow fibers flows into the flush pump accessory under select operating conditions, while the outlet is only in fluid communication with an external space that surrounds the semi-permeable hollow fibers and is defined by the housing.

3. The device of claim 2, wherein the filtration unit includes a first header space that is in fluid communication with both the inlet and the filter element, a second header space that is in fluid communication with the filter element and the flush pump accessory.

4. The device of claim 3, wherein the plurality of semi-permeable hollow fibers are arranged longitudinally within the housing, the semi-permeable hollow fibers including open first ends in communication with the first header space and open second ends in communication the second header space, wherein the external space is not in direct fluid communication with the open first and second ends of the semi-permeable hollow fibers.

5. The device of claim 3, wherein the flush pump conduit is in direct fluid communication with the second header space.

6. The device of claim 3, further comprising a first potting compound that surrounds first ends of the semi-permeable hollow fibers and partially defines the first header space and a second potting compound that surrounds second ends of the semi-permeable hollow fibers and partially defines the second header space, the first ends of the semi-permeable hollow fibers being open to the first header space and the second ends of the semi-permeable hollow fibers being open to the second header space.

7. The device of claim 6, wherein the outlet is fluidly connected to the interior space along a flow path that is outside of the second potting compound to allow purified liquid to flow from the interior space to the outlet without passing through the second potting compound.

8. The device of claim 2, wherein the bulb pump comprises a compressible bulb that is configured to create a negative pressure when compressed to thereby cause unpurified liquid to flow into the second header space and be drawn into the first conduit.

9. The device of claim 2, further including a flush valve that is disposed along the flush pump conduit, the flush valve being movable between an open position in which fluid can flow from the inlet of the filtration unit to the flush pump conduit and a closed position in which fluid is prevented from flowing out of the flush pump conduit.

10. The device of claim 9, further including a plurality of valves associated with the flush pump accessory and configured to permit the fluid to only flow in one direction away from the filtration unit and toward an open distal end of the flush pump conduit.

11. The device of claim 10, wherein the plurality of valves include a first valve that is located between the bulb pump and the inlet and a second valve located between the bulb pump and the open distal end.

12. The device of claim 11, wherein the first and second valves comprise one way check valves that only allow liquid to flow in a direction toward the flush valve.

13. The device of claim 11, wherein the first valve is disposed along the flush pump conduit between the bulb pump and the filtration unit.

14. The device of claim 2, further including a first end cap fitted to a first end of the housing and an opposing second end cap fitted to a second end of the housing, the second end cap having the outlet integrally formed therein and an opening that is in fluid communication with the lumens of the semi-permeable hollow fibers and is positioned to mate with the flush pump conduit to allow fluid from the lumens of the semi-permeable hollow fibers to flow into the flush pump conduit.

15. The device of claim 2, wherein the plurality of semi-permeable hollow fibers comprises a bundle of fibers and the interior space is a space that surrounds the bundle and is formed adjacent and inner surface of the housing.

16. The device of claim 2, wherein the fluid pump accessory is configured to operate in a plurality of operating modes including a field integrity test in which the integrity of the filtering element is tested, wherein a failure of the filtering element is represented by the bulb pump assuming an inflated condition after being collapsed and after passage of a predetermined period of time and wherein, integrity of the filtering element is confirmed when the bulb pump maintains a collapsed position after passage of the predetermined period of time.

17. The device of claim 16, wherein during performance of the filter integrity test, the inlet is closed to prevent fluid from entering the first header space and the outlet is open to atmosphere.

18. The device of claim 2, wherein the portable liquid purifying device is incorporated into a portable hydration pack that that has a reservoir that hold the source of liquid which comprises water and an elongated flexible drink tube is fluidly connected to the outlet, the drink tube having a valve to allow a user to control discharge of purified water from the drink tube.

* * * * *